March 29, 1966  H. MAIER ETAL  3,242,771
ROTARY INDEXING TABLE FOR A MACHINE TOOL
Filed Oct. 22, 1963
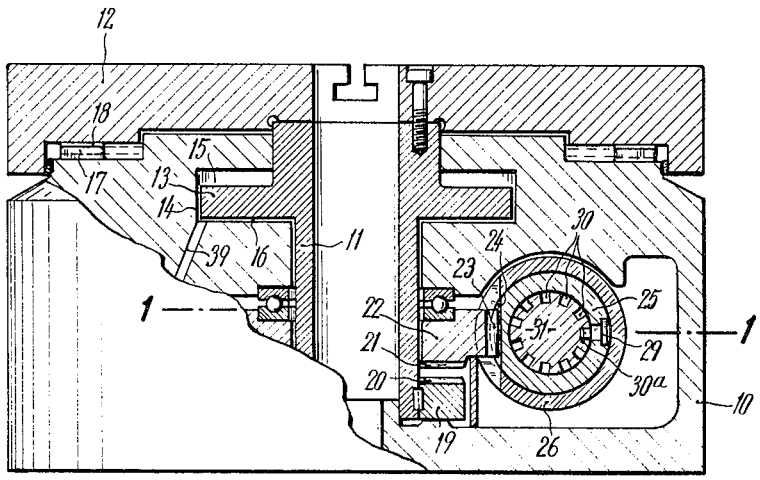
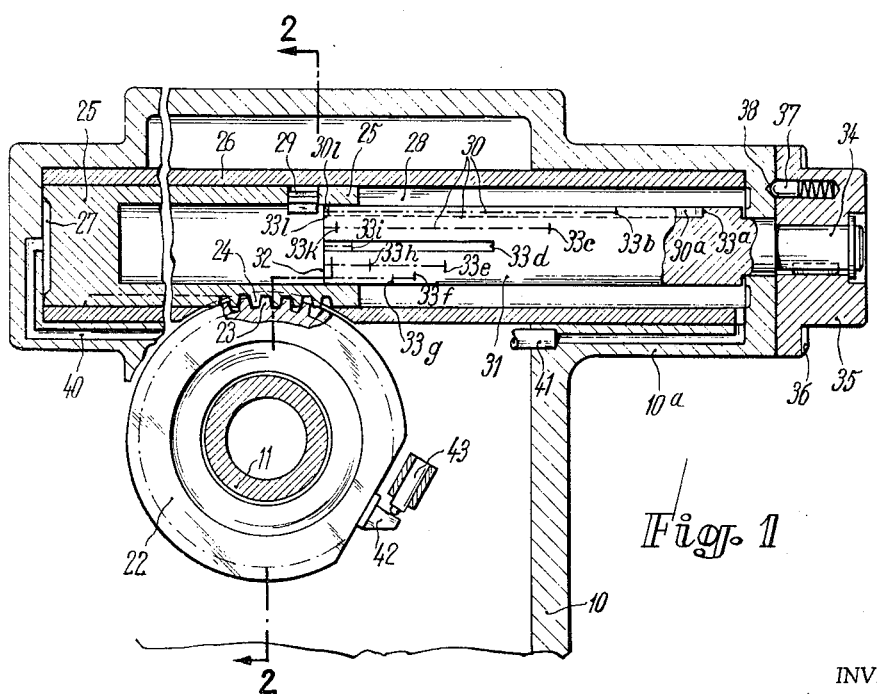
INVENTORS
Heinz Maier
Hermann Wieland
Georg Schlenga
BY
Michael J. Striker
ATTORNEY United States Patent Office 3,242,771
Patented Mar. 29, 1966

3,242,771
ROTARY INDEXING TABLE FOR A MACHINE TOOL
Heinz Maier and Hermann Wieland, Weinsberg, and Georg Schlenga, Binswangen, near Heilbronn, Germany, assignors to Fischer-Brodbeck G.m.b.H., Weinsberg (Wurttemberg), Germany
Filed Oct. 22, 1963, Ser. No. 317,950
Claims priority, application Germany, Oct. 27, 1962, F 38,170
11 Claims. (Cl. 74—826)

The present invention relates to a rotary indexing table for a machine tool or the like.

Rotary indexing tables generally comprise a work table on which one or more work pieces are mounted and which is periodically rotated by an indexing mechanism for certain angular distances in accordance with the number of stations on each of which certain work is to be carried out on the workpieces. The movement of the work table from one station to the other may be carried out mechanically or by pneumatic or hydraulic means, for example, by means of a control member in the form of a cylinder and a piston therein, the movements of which are transmitted by gear means to the work table. The size of the graduation of the individual rotary movements of the work table may be determined, for example by a stop member which limits the stroke of the control member in the axial direction.

It is the primary object of the present invention to provide a setting and control mechanism for a rotary indexing table which is of a very simple design and of an inexpensive and reliable construction and which especially permits the necessary adjustments to be carried out very easily and accurately.

Another object of the invention consists in combining the stop means for limiting the stroke of the control element and thus for controlling the extent of each movement of the indexing table in accordance with the desired graduation in a very compact arrangement and in a manner so that the control and setting elements are slidable within each other in a manner similar to concentric pistons.

An important feature of the present invention therefore consists in the provision of a rotatable setting member which may be adjusted from the outside of the machine and is connected to the axially movable control member in a manner so that the two members are telescopically slidable within each other, and which cooperates with the control member by stop means and counterstop means so that, whenever the setting member is turned, different stop means which are axially offset relative to each other are brought into action and then determine the length of the stroke of the control member in accordance with the axial distance between the stop means.

Further preferred features of the invention consist in designing the setting member in the form of an inner control roller which is enclosed by the tubular axially movable control member and is provided with a plurality of longitudinal grooves of different lengths which are equally spaced from each other around the periphery of the setting member and the ends of which form stops which are adapted to engage with a counterstop member on the control member which is provided in the form of an inwardly projecting key, tooth or the like on the inner periphery of the tubular control member.

The above-mentioned as well as further features and advantages of the present invention will become more clearly apparent from the following detailed description thereof which is to be read with reference to the accompanying drawings, in which—

FIGURE 1 shows a horizontal longitudinal section of the apparatus, which is taken along the line 1—1 of FIGURE 2; while
FIGURE 2 shows a cross section which is taken along the line 2—2 of FIGURE 1, but in which the control member is slipped telescopically over the setting member.

As illustrated in the drawings, the rotary indexing table comprises a stationary housing 10 which, although not indicated, is in actual practice composed of several parts and in which by means of a hub 11 the work table or indexing plate 12 is mounted so as to be adjustable in axial direction of the hub. This hub 11 has a piston 13 rigidly secured thereto which is slidable in a chamber in housing 1 forming a cylinder 14. Piston 13 has two piston surfaces 15 and 16.

Housing 10 also has rigidly secured thereto a circular row of gear teeth 17 which engages with a corresponding row of gear teeth 18 on the lower side of the work table 12 when the latter is lowered and which disengages therefrom when work table 12 is lifted.

On its lower end, hub 11 further carries rigidly thereon a ring 19 which is provided on its upper side with a fine set of teeth 20 which are adapted to engages with a corresponding set of teeth 21 on a gear wheel 22 when the hub 11 together with the work table 12 is lifted. Gear wheel 22 is further provided with a rim of teeth 23 which engages with rack teeth 24 on a tubular control member 25 which also serves as a piston and is slidable within a cylinder 26 when a pneumatic or hydraulic pressure medium acts in cylinder 26 either upon one side 27 or the other side 28 of the piston. On its inner side, the control member 25 has a projection, for example, a key or tooth 29, which is adapted to engage into one of the longitudinal grooves 30, 30a etc. which are cut into the outer peripheral surface of the setting member 31 which forms an inner roller. These longitudinal grooves 30, which, with the exception of groove 30a, are indicated in FIGURE 1 only by their center lines all extend from the end surface 32 of the setting member 31 facing the control member 25, but have different lengths, the longest groove 30 terminating at 33a and each groove following in a peripheral direction being shorter than the preceding groove and terminating at different points 33b to 33l. The ends of these grooves form stops against which the projection 29 is adapted to engage in the manner as will be subsequently described. The projection 29 forms, therefore, a counter stop means cooperating with stop means formed by the ends of the grooves.

The setting member 31 is provided at one end with a journal 34 which extends through the end wall of the housing extension 10a and carries outside of the latter a control knob 35 which is provided, for example, with a dial or mark 36 which is associated with a corresponding mark or dial on the housing extension 10a for indicating the selected setting. An arresting pin 37 in knob 35 which is acted upon by a spring is adapted to engage into one or another of the recesses 38 in the end wall of the housing extension 10a which correspond to the location and number of grooves 30.

The chambers 15 and 16 of cylinder 14 as well as the chambers 27 and 28 of cylinder 26 are supplied in a suitable manner with a pressure medium, for example, through a channel 39 leading to chamber 16 and channels 40 and 41 leading to chambers 27 and 28, respectively.

The mode of operation of the apparatus as above described is as follows:

When the setting member 31 is in the position as illustrated, the projection 29 is in alignment with groove 30a which has the greatest length of grooves 30. When a pushbutton or the like, not shown, is then actuated, for example, the pushbutton for switching on the automatic mechanism of the apparatus, the pressure medium is first passed by suitable control means into the cylinder chamber 16, whereby the piston 13 together with work table 12 and ring 19 is lifted. Gear teeth 17 and 18 are thereby disengaged from each other, while at the same time the two sets of fine teeth 20 and 21 are engaged with each other.

The pressure medium is then passed into the cylinder chamber 27 containing the control member 25 so that the latter is moved from the position as shown in FIGURE 1 toward the right, whereby the projection 29 passes into and slides along groove 30a until it engages upon the end 33a of this groove which forms a stop. This axial movement of the control member 25 is transmitted by the gear teeth 24 and 23 to gear wheel 22 which is thereby turned. This rotary movement of gear wheel 22 is, in turn, transmitted by the two sets of fine teeth 21 and 20 to the ring 19 and thus also to the work table 12 to turn the latter for the angular distance in accordance with the selected setting, that is, in the case as illustrated, for the longest possible distance in accordance with the length of groove 30a.

Hereafter the pressure medium is passed into the cylinder chamber 15 with the result that the work table 12 is lowered to its original position, whereby the gear teeth 17 and 18 are engaged with each other so as to lock the work table 12 to the housing 10, while the gear teeth 20 on ring 19 are disengaged from the teeth 21 on gear wheel 22. The workpieces which are mounted on work table 12 are thus moved to and locked in the position in which certain operations may be carried out thereon. When gear wheel 22 is disengaged from work table 12, the pressure medium may be passed into the cylinder chamber 28 to shift the pistonlike control member 25 back to its original position as shown in FIGURE 1. Thereafter the cycle of operations as previously described may be repeated which may be started, for example, by the engagement of the stops 42 and 43.

If the work table 12 is to be turned at a different graduation, the control knob 35 is turned until the longitudinal groove 30 which corresponds to the desired graduation is in alignment with the projection 29 which is indicated by the mark and dial 36 and is noticeable also by the engagement of the arresting pin 37 in the corresponding recess 38. The shortest groove 30 with the end 331 may, for example, be of a length corresponding to the spacing of only one tooth of the gear teeth 17, 18 so that, when the control member 25 is set accordingly, the work table 12 will be moved progressively only from one tooth 17, 18 to the next tooth.

Although our invention has been illustrated and described with reference to the preferred embodiment thereof, we wish to have it understood that it is in no way limited to the details of such embodiment, but is capable of numerous modifications within the scope of the appended claims.

Having thus fully disclosed our invention, what we claim is:

1. A circular indexing table for a machine tool comprising a housing, an indexing plate, means for rotatably mounting said plate on said housing, means for locking said plate at different rotary positions in a fixed position relative to said housing, a control member, means for mounting said control member so as to permit the same to carry out a reciprocating control movement, means for transmitting said control movement of said control member to said indexing plate in such a manner that, when said control member is moved for a certain distance in one control direction, said indexing plate carries out a rotary movement for an angular distance in proportion to the distance of said control movement, a setting member, one of said members being of tubular shape and surrounds the other of said members and both members being telescopically slidable relative to each other during the control movement of said control member, a plurality of stop means on one of said members offset relative to each other in said control direction and angularly spaced from each other on the periphery of said member carrying the same, counterstop means on the other of said members, and means for adjusting said setting member in a setting direction differing from said control direction by carrying out a rotary setting movement, whereby said stop means may be selectively moved into alignment with the path of movement of said counterstop means so that, when said control member is moved in said control direction, said stop means will limit said control movement of said control member to different lengths and will thereby also limit the rotary movement of said indexing plate to different angular distances.

2. An apparatus as defined in claim 1, in which said means for transmitting said control movement of said control member to said indexing plate comprise a set of rack teeth on said control member, a gear wheel coaxial to said index plate and in mesh with said rack teeth, and means for connecting said gear wheel to said indexing plate.

3. An apparatus as defined in claim 1, further comprising bearing means for rotatably mounting said setting member on said housing, said means for adjusting said setting member comprising a shaft secured to said setting member and extending through said bearing means, a control knob on said shaft outside of said housing, and associated mark and dial means on said control knob and said housing for indicating the graduation to which said setting member is adjusted.

4. An apparatus as defined in claim 1, in which said stop means are mounted on said setting member and said counter stop means are mounted on said control member.

5. An apparatus as defined in claim 1, wherein said control member is tubular and said setting member forms a roller within said tubular member and coaxial thereto.

6. An apparatus as defined in claim 5, in which said stop means are mounted on the outer periphery of said setting member and said counterstop means are mounted on the inner side of said control member.

7. An apparatus as defined in claim 1, in which said member carrying said stop means has a plurality of grooves of different lengths extending longitudinally from one end of said member toward its other end, the other end of each of said grooves in said member forming one of said stop means, said counterstop means consisting of a projection on the other of said two members, said projection having such a size and being disposed in such a position relative to said member containing said grooves that when said members are moved telescopically into each other, said projection will slide into and along one of said grooves.

8. An apparatus as set forth in claim 7, including bearing means for rotatably mounting said setting member on said housing and wherein said counterstop means are disposed in said housing on the side thereof remote from said bearing means and wherein said stop means are disposed in said housing in such a way that the one end of said member from which said grooves extend is located in the housing on the side thereof remote from said bearing means.

9. A circular indexing table for a machine tool comprising a housing, an indexing plate, means for rotatably mounting said plate on said housing, a control member, a setting member disposed coaxially to said control member, one of said members being of a tubular shape and adapted to surround the other member, means for reciprocating said control member in its axial direction whereby said two members are telescopically movable into each other, means for rotating said setting member, a plurality of stop means on one of said two members and distributed around the periphery thereof and offset relative to each other in the axial direction of said two members, counterstop means on the other of said two members operatively associated with said stop means in such a manner that, depending upon the particular rotary position of said setting member, said counterstop means will engage with one of said stop means when said control member reaches the end of a stroke of a variable length in one direction of its reciprocating movement, the length of said stroke thus being limited by the engagement of said stop and counterstop means, means for transmitting an axial movement of said control member to said indexing plate in the form of a rotary movement of the latter, a cylinder mounted on said housing and surrounding said control member and said setting member and forming at least one cylinder chamber between said frame, said control member and said setting member, and means for conducting a pressure medium to said cylinder chamber for producing an axial movement of said control member.

10. An apparatus as defined in claim 9, in which said control member is of a tubular shape and surrounds said setting member, said control member together with said cylinder defining a second cylinder chamber at the side of said control member opposite to the side of the location of said setting member, and additional means for conducting a pressure medium also to said second cylinder chamber so that, when said pressure media are alternately conducted to said two cylinder chambers, said control member will be reciprocated.

11. A circular indexing table for a machine tool comprising a housing, an indexing plate, means for rotatably mounting said plate on said housing, means for locking said plate at different rotary positions in a fixed position relative to said housing, said means comprising a pair of associated sets of teeth on said housing and on said indexing plate adapted to engage with each other, a control member, means for mounting said control member so as to permit the same to carry out a reciprocating control movement, means for transmitting said control movement of said control member to said indexing plate, said means transmitting said control movement comprising another pair of associated sets of teeth adapted to engage with each other and means for alternatively engaging the two sets of teeth of one pair with each other and for simultaneously disengaging the two sets of teeth of the other pair from each other, said control movement of said control member being transmitted to said indexing plate in such a manner that, when said control member is moved for a certain distance in one control direction, said indexing plate carries out a rotary movement for an angular distance in proportion to the distance of said control movement, a setting member, a plurality of stop means on one of said members offset relative to each other in said control direction and angularly spaced from each other on the periphery of said member carrying the same, counterstop means on the other of said members, and means for adjusting said setting member in a setting direction differing from said control direction by carrying out a rotary setting movement, whereby said stop means may be selectively moved into alignment with the path of movement of said counterstop means so that, when said control member is moved in said control direction, said stop means will limit said control movement of said control member to different lengths and will thereby also limit the rotary movement of said indexing plate to different angular distances.

References Cited by the Examiner
UNITED STATES PATENTS

| | | | |
|---|---|---|---|
| 2,438,463 | 3/1948 | Snader et al. | 92—13 |
| 2,975,657 | 3/1961 | Samuel | 74—826 |
| 3,080,852 | 3/1963 | Geyer | 92—13 |
| 3,085,452 | 4/1963 | Thompson | 74—822 |

BROUGHTON G. DURHAM, *Primary Examiner.*

J. A. MARSHALL, *Assistant Examiner.*